United States Patent [19]

Koch

[11] Patent Number: 5,227,478
[45] Date of Patent: Jul. 13, 1993

[54] 2-CHLORO-4-[4'-(4'',8''-DISULFONAPHTH-2''-YLAZO)-2'-METHOXY-5'-METHYLANILINO]-6-SUBSTITUTED AMINO-1,3,5-TRIAZINES AND THEIR USE

[75] Inventor: Werner Koch, Oberwil, Switzerland

[73] Assignee: Sandoz Ltd., Basel, Switzerland

[21] Appl. No.: 825,362

[22] Filed: Jan. 24, 1992

Related U.S. Application Data

[63] Continuation of Ser. No. 351,243, May 12, 1989, abandoned, which is a continuation of Ser. No. 101,053, Sep. 26, 1987, abandoned, which is a continuation-in-part of Ser. No. 529,401, Sep. 6, 1983, abandoned.

[30] Foreign Application Priority Data

Sep. 13, 1982 [GB] United Kingdom ............... 8226002

[51] Int. Cl.$^5$ ............................................. C09B 62/085
[52] U.S. Cl. ............................................. 534/638; 8/549
[58] Field of Search ............................. 534/638; 8/549

[56] References Cited

U.S. PATENT DOCUMENTS

| | | | |
|---|---|---|---|
| 3,884,626 | 5/1975 | Hoster et al. ............................. | 8/54 |
| 4,563,518 | 1/1986 | Henk .................................... | 534/638 |

FOREIGN PATENT DOCUMENTS

| | | |
|---|---|---|
| 607714 | 8/1961 | Belgium . |
| 703182 | 8/1967 | Belgium . |
| 53750 | 6/1982 | European Pat. Off. . |
| 869279 | 5/1961 | United Kingdom . |
| 2024835 | 1/1980 | United Kingdom . |
| 2031932 | 4/1980 | United Kingdom . |

*Primary Examiner*—Allen J. Robinson
*Assistant Examiner*—Shailendra Kumar
*Attorney, Agent, or Firm*—Robert S. Honor; Melvyn M. Kassenoff

[57] ABSTRACT

Compounds of the formula

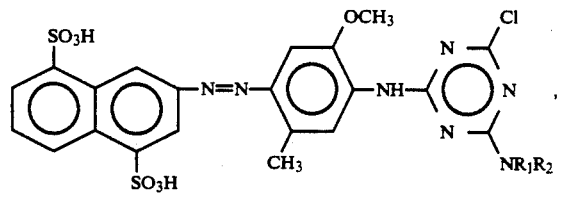

in which either and salts thereof
$R_1$ is hydrogen or hydroxy-$C_{2-3}$alkyl, and
$R_2$ is hydroxy-$C_{2-3}$alkyl, or
$R_1$ is hydrogen or 2-cyanoethyl, and
$R_2$ is —$CH_2CH_2OCH_2CH_2OH$, and mixtures of such compounds, which compounds are in free acid or salt form, are useful for dyeing or printing hydroxy group- or nitrogen-containing organic substrates, particularly leather and textiles containing or consisting of natural or synthetic polyamides or of natural or regenerated cellulose, especially textile material containing or consisting of cotton.

18 Claims, No Drawings

2-CHLORO-4-[4'-(4",8"-DISULFONAPHTH-2"-YLAZO)-2'-METHOXY-5'-METHYLANILINO]-6-SUBSTITUTED AMINO-1,3,5-TRIAZINES AND THEIR USE

This is a continuation of application Ser. No. 07/351,243, filed May 12, 1989 and now abandoned, which is a continuation of application Ser. No. 07/101,053, filed Sep. 26, 1987 and now abandoned, which is a continuation-in-part of application Ser. No. 06/529,401, filed Sep. 6, 1983 and now abandoned.

The present invention relates to chloro-triazinyl monoazo compounds, their preparation and use as fibre-reactive dyestuffs.

More particularly, this invention provides compounds which, in free acid form, correspond to formula I,

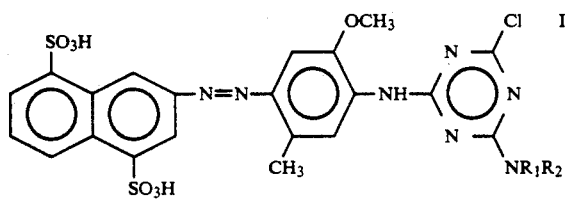

in which
either $R_1$ is hydrogen or hydroxy-$C_{2-3}$alkyl,
and $R_2$ is hydroxy-$C_{2-3}$alkyl
or, $R_1$ is hydrogen or 2-cyanoethyl,
and $R_2$ is —$CH_2CH_2OCH_2CH_2OH$,
and mixtures of such compounds, which compounds are in free acid or salt form.

In any hydroxy-substituted alkyl group the hydroxy group is bound to a carbon atom other than the $C_1$-atom.

Preferred compounds of formula I are those in which any hydroxyalkyl as $R_1$ and/or $R_2$ is 2-hydroxyethyl. More preferred are compounds of formula I wherein $R_1$ is hydrogen or 2-hydroxyethyl and $R_2$ is 2-hydroxyethyl. Most preferred is the compound wherein $R_1$ is hydrogen and $R_2$ is 2-hydroxyethyl.

Preferred mixtures of compounds of formula I are those in which in a compound A $R_1$ is hydrogen and $R_2$ is 2-hydroxyethyl, and in a compound B $R_1$ and $R_2$ are both 2-hydroxyethyl. Preferably, these mixtures contain the compounds A and B in a molar ratio range of from 90:10 to 10:90, more preferably 75:25 to 25:75.

The cations of the sulpho groups when the compounds of formula I are in salt form may be any of those non-chromophoric cations common in the chemistry of reactive dyestuffs. Examples of suitable cations are alkali metal cations and unsubstituted or substituted ammonium ions, such as lithium, sodium, potassium, ammonium, mono-, di-, tri- and tetra-methylammonium, triethylammonium and mono-, di-and tri-ethanolammonium.

The preferred cations are the alkali metal cations and ammonium, with sodium being the most preferred.

The present invention further provides a process for the preparation of the compounds of formula I comprising reacting the following components:
the diazotized amino compound of formula II,

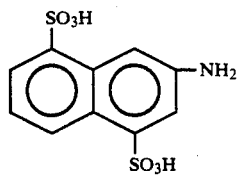

the coupling component of formula III,

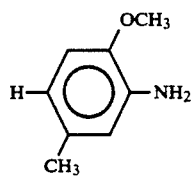

cyanuric chloride, and
a compound of formula IV, $$HNR_1R_2 \qquad IV$$

or a mixture thereof,
which components must be present in the corresponding stoichiometric molar ratio to obtain a compound of formula I—by coupling and condensing in any desired order.

More particularly, it is preferred to prepare the compounds of formula I by condensing a compound of formula V,

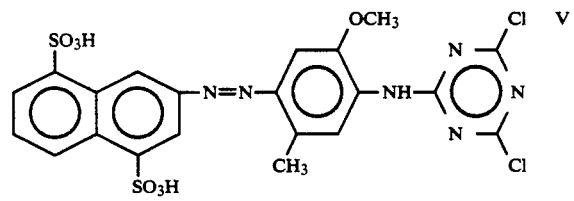

in free acid or salt form, with a compound of formula IV $$HNR_1R_2 \qquad IV$$

or a mixture thereof.

Diazotization and coupling may be effected in conventional manner. The replacement of the chlorine atoms in cyanuric chloride by separate condensation steps may be effected in accordance with conventional methods, e.g., the replacement of the first chlorine atom may be carried out at temperatures of from 0° to 10° C., preferably at 0° to 5° C. The replacement of the second chlorine atom may be effected at temperatures of from 20° up to 55° C. in an alkaline medium.

The compounds of formula I may be isolated in accordance with known methods, for example, by conventional salting out with alkali metal salt, filtering and drying in a vacuo. Depending on the reaction and isolation-conditions a compound of formula I is obtained in free acid or preferably salt form or even mixed salt forms containing, for example, one or more of the above mentioned cations. It may be converted from free acid form to a salt form or mixture of salt forms or vice versa or from one salt form to another by conventional means.

The starting materials, compounds of formulae II, III and IV, are either known or may be prepared in accordance with known methods from available starting materials.

The compounds of formula I and mixtures thereof, which are preferably in salt form, are useful as reactive dyestuffs for dyeing or printing hydroxy group- or nitrogen-containing organic substrates. Preferred substrates are leather and textiles containing or consisting nylon, natural or regenerated cellulose such as cotton, viscose and spun rayon. The most preferred substrate is textile material containing or consisting of cotton.

Dyeing or printing is effected in accordance with known methods. Since the compounds of formula I exhaust well from the dyebath they are suitable for all conventional dyeing processes using the exhaust dyeing method. They may be applied according to conventional methods per se or in combination with appropriate other fibre-reactive dye-stuffs having analogous dyeing properties and, since they are well compatible, also in important three component dye mixtures. The dyeings obtained with such combination mixtures have good fastness properties and do not show catalytic fading.

The compounds of formula I give high exhaust and fixation yields. The portion of unfixed dye can be easily washed off the substrate. Furthermore, the dyes disclosed in the Specification have good build-up properties, and thus their ability to produce deep shades is high.

Since the reactivity of the compounds of formula I to the substrate is not temperature dependent in the usual dyeing temperature ranges dyeing may be effected equally well at 100° C. as at 0° C. without any loss of fixation yield, even in some cases the fixation yield will be increased at 100° C. Evidently, the dye-stuffs of the present invention are hydrolysis resistant at high temperatures and passing over the dyeing temperature will not be critical to the fixation yield. Advantageously, a dyeing temperature of about 100° C. may be utilized because dyestuffs migrate better at high temperatures thus giving more even dyeings.

The following examples further serve to illustrate the invention. In the examples all parts and percentages are by weight or volume and the temperatures are in degrees Centigrade.

EXAMPLE 1

75.8 Parts 2-aminonaphthalene-4,8-disulphonic acid are diazotized in accordance with known methods. To the resulting diazo suspension a solution of 34.3 parts 2-amino-1-methoxy-4-methylbenzene in a mixture of water and hydrochloric acid are added dropwise, and coupling is effected whilst gradually adding a total amount of 42.5 parts sodium bicarbonate with stirring. After four hours the resulting monoazo dyestuff is isolated by heating the reaction mixture to 60° and adding hydrochloric acid up to pH 1. The dyestuff which precipitates is filtered and washed with a solution comprising water, sodium chloride and 30% hydrochloric acid.

The thus obtained product is stirred in 1000 parts water and completely dissolved by the addition of ca. 25 parts 30% sodium hydroxide solution to give a medium with pH 8. This solution is stirred overnight. After the addition of 500 parts ice the temperature is reduced to $-1°$. Subsequently, 46 parts cyanuric chloride are added, and the condensation reaction starts at about 7°. The reaction is completed in approximately two hours whereby the temperature is raised to 30° for the last hour.

For the next condensation step 19.8 parts monoethanolamine diluted with 50 parts water are added to the reaction mixture within 5 minutes whereby the pH rises to 11.2. Stirring is effected for 15 minutes and the temperature is then elevated to 50°. After a further 20 minutes stirring the pH falls to 7 and stirring is continued for approximately three hours. Then, further 2 parts monoethanolamine diluted with water are added and stirring is continued until a pH of ca. 8.8 is reached which remains unchanged.

The product is isolated by portionwise adding of 300 parts sodium chloride, filtering and drying in a vacuo at 60°. The thus obtained dyestuff which in form of the free acid corresponds to the formula

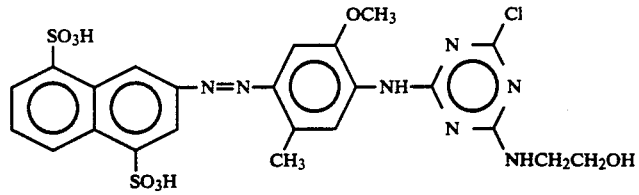

Furthermore, the compounds of this invention are notably well soluble in water, even in electrolyte-containing dyeing liquors. They show only low sensitivity to the addition of salt, i.e., their water-solubility will not change when adding necessary amounts of salt to the dyebath.

The dyeings obtained with the compounds of formula I show good light fastness and wet fastness properties, e.g., wash-, water-, sea water and sweat-fastness. Further, they have good fastness to chlorinated water, peroxide and perborate-containing wash liquors.

is highly soluble in water and dyes cotton in yellow shades. The dyeings show good light fastness and wet fastness properties.

In analogy with the method described in Example 1 but using instead of monoethanolamine the corresponding amount of other mono- or disubstituted amines or a mixture of such amines further compounds of formula I are obtained which are listed in the following Table. These dyes or mixture of dyes also give yellow dyeings on cotton.

| Example No. | $R_1$ | $R_2$ |
| --- | --- | --- |
| 2 | —CH$_2$CH$_2$OH | —CH$_2$CH$_2$OH |
| 3 | —CH$_2$CH$_2$CN | —CH$_2$CH$_2$OCH$_2$CH$_2$OH |

| Example No. | $R_1$ | $R_2$ | |
|---|---|---|---|
| 4 | H | " | |
| 5 | { H  —CH₂CH₂OH | —CH₂CH₂OH  " } | 75% by weight  25% by weight |

The preparation of a dye mixture containing different groups —NR₁R₂, e.g., the mixture of Example 5, may be carried out by step-wise reaction first with ¾ mole equivalent of monoethanolamine and second with ¼ mole equivalent of diethanolamine but using a 30% excess of the last component. This condensation is effected at 40° and pH 7 during ten hours.

In accordance with the reaction- and isolation-conditions as described the dyestuffs of Examples 1 to 5 are obtained in sodium salt form. They may, depending on the reaction-/isolation-conditions or by reacting the sodium salts in accordance with known methods, also be obtained in free acid form or in other salt forms, for example those salt forms containing one or more cations indicated in the description hereinbefore.

In the following examples the application of the dyestuffs of this invention is illustrated.

APPLICATION EXAMPLE A

To a dyebath consisting of 1000 parts water, 20 parts Glauber's salt (calcinated), 2.5 parts sodium carbonate (calcinated) and 1 part of sodium 1-nitrobenzene-3-sulphonate, 50 parts mercerized cotton fabric are added. The bath is heated to 40°, then 1 part of the dye of Example 1 is added. The temperature is raised to 98° within 45 minutes; during this time 20 parts Glauber's salt (calcinated) are added after 15 minutes and again 20 parts Glauber's salt (calcinated) are added after further 15 minutes. At the end of this time 7.5 parts sodium carbonate (calcinated) are added. Dyeing is continued at the boil for 45 to 60 minutes. Subsequently, the dyed fabric is rinsed hot and soaped at the boil for 20 minutes in 500 parts water and 0.5 parts sodium alkylsulphonate. After rinsing and drying a yellow cotton dyeing with good fastness properties is obtained.

APPLICATION EXAMPLE B

To a dyebath consisting of 1000 parts water, 60 parts Glauber's salt (calcinated), 15 parts sodium carbonate (calcinated) and 1 part of sodium 1-nitrobenzene-3-sulphonate, 50 parts of cotton fabric are added. The bath is heated to 60°. Subsequently, 1.5 parts of the dye of Example 1 are added. The temperature is kept at 60° for 15 minutes and is then raised to 98° within 30 minutes. Dyeing is continued for 45–60 minutes at 98°. The dyed fabric is rinsed hot and soaped according to the method given in Application Example A. After rinsing and drying a yellow cotton dyeing is obtained having good fastness properties.

APPLICATION EXAMPLE C

1 Part of the dyestuff of Example 1 is dissolved in 2000 parts water. 100 Parts cotton fabric are added and the temperature of the dyebath is raised to 80° within 10 minutes. 100 Parts Glauber's salt (calcinated) are added and 30 minutes thereafter, 20 parts sodium carbonate (calcinated). Dyeing is continued for one hour at 80°. Subsequently, the dyed fabric is rinsed cold, then hot, and is soaped according to the method given for Application Example A. After rinsing and drying a yellow cotton dyeing is obtained having good fastness properties.

Similarly, the dyes or mixtures of Examples 2 to 5 may be employed to dye cotton in accordance with the method given for Application Examples A, B or C.

What is claimed is:

1. A compound of the formula

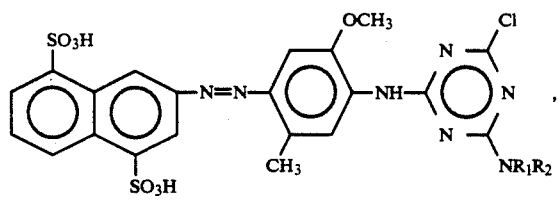

or a salt thereof each cation of which is independently a nonchromophoric cation, wherein
$R_1$ is hydrogen or hydroxy($C_{2-3}$alkyl), and
$R_2$ is hydroxy($C_{2-3}$alkyl), or
$R_1$ is hydrogen or 2-cyanoethyl, and
$R_2$ is —CH₂CH₂—O—CH₂CH₂OH,
or a mixture of such compounds each of which is in free acid form or a salt form each cation of which is independently a non-chromophoric cation.

2. A compound according to claim 1, or a salt thereof each cation of which is independently a non-chromophoric cation,
wherein the hydroxy group of each hydroxy($C_{2-3}$alkyl) is in other than the 1-position,
or a mixture of such compounds each of which is in free acid form or a salt form each cation of which is independently a non-chromophoric cation.

3. A compound according to claim 2, or a salt thereof each cation of which is independently a non-chromophoric cation, wherein
$R_1$ is hydrogen or 2-hydroxyethyl, and
$R_2$ is 2-hydroxyethyl,
or a mixture of such compounds each of which is in free acid form or a salt form each cation of which is independently a non-chromophoric cation.

4. A mixture according to claim 3 consisting essentially of
(A) the compound of the formula

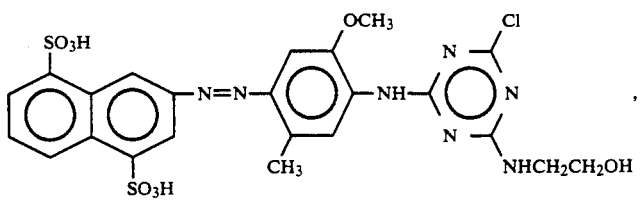

or a salt thereof each cation of which is independently a non-chromophoric cation, and
(B) the compound of the formula

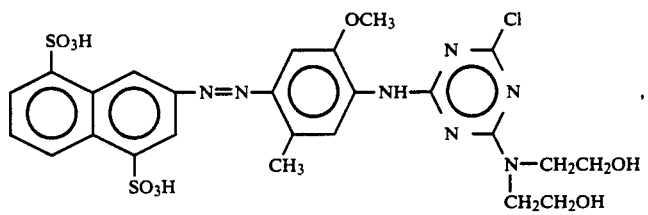

or a salt thereof each cation of which is independently a non-chromophoric cation.

5. A mixture according to claim 4 wherein the molar ration of (A) to (B) is 9:1 to 1:9.

6. A mixture according to claim 5 wherein the molar ration of (A) to (B) is 3:1 to 1:3.

7. A mixture according to claim 6 wherein both compounds are in sodium salt form.

8. A mixture according to claim 4 wherein both compounds are in sodium slat form.

9. A compound according to claim 2, or a slat thereof each cation of which is independently a non-chromophoric cation.

10. A compound according to claim 9, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

11. A compound according to claim 10, or a slat thereof each cation of which is independently lithium, sodium, potassium or ammonium.

12. A compound according to claim 11, or a sodium salt thereof.

13. The compound according to claim 9 having the formula

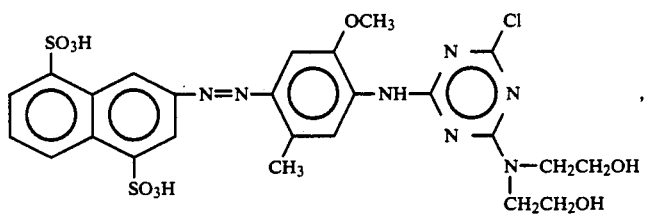

or a salt thereof each cation of which is independently a non-chromophoric cation.

14. The compound according to claim 13 in sodium salt form.

15. The compound according to claim 9 having the formula

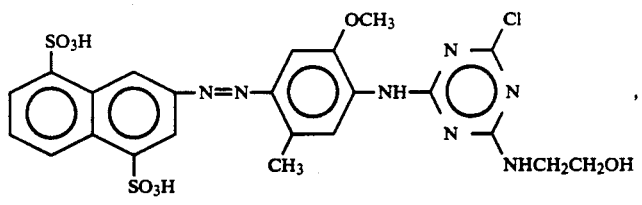

or a salt thereof each cation of which is independently a non-chromophoric cation.

16. The compound according to claim 15 in sodium salt form.

17. A process for dyeing or printing an hydroxy group- or nitrogen-containing organic substrate comprising applying there to a compound or a mixture according to claim 1 as dyeing or printing agent.

18. A process according to claim 17, wherein the substrate is a textile comprising cotton.

* * * * *